A. COLLET.
TOOL FOR CUTTING SEATS IN RAILWAY SLEEPERS.
APPLICATION FILED JAN. 27, 1906.
No. 901,681.
Patented Oct. 20, 1908.
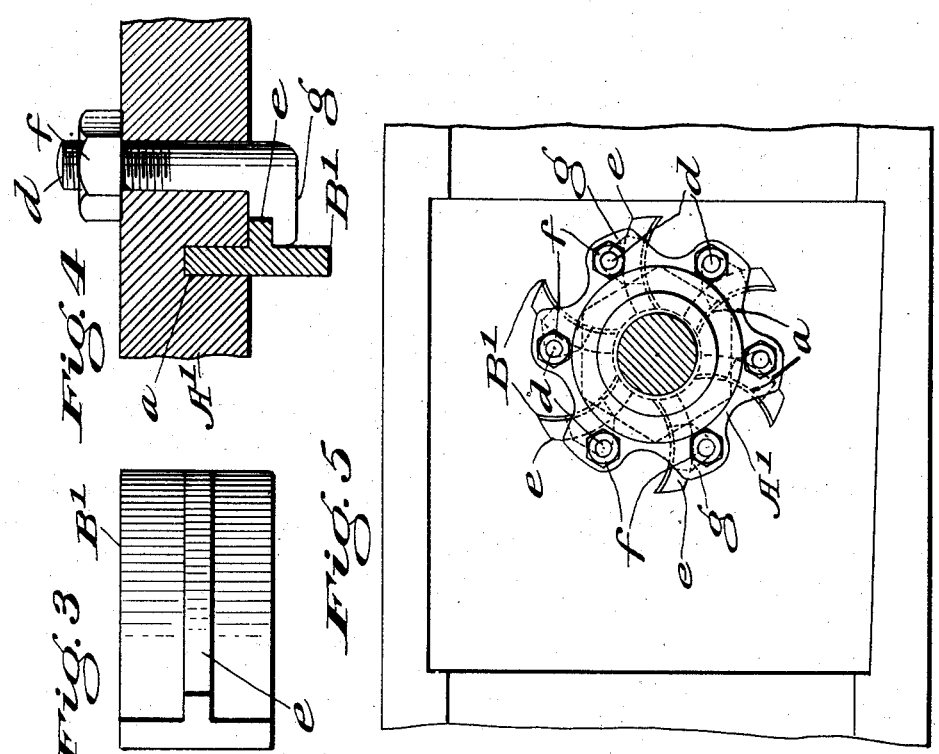
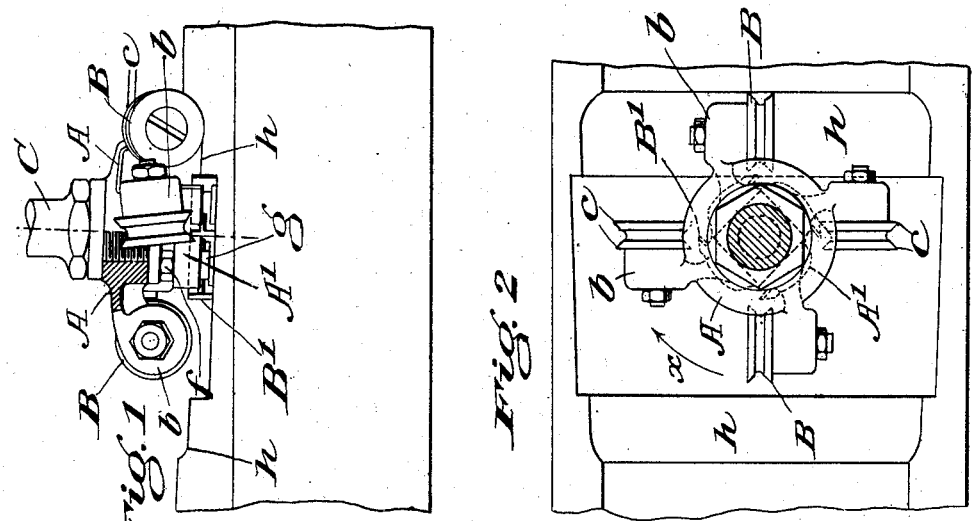

UNITED STATES PATENT OFFICE.

ALBERT COLLET, OF PARIS, FRANCE.

TOOL FOR CUTTING SEATS IN RAILWAY-SLEEPERS.

No. 901,681.     Specification of Letters Patent.     Patented Oct. 20, 1908.

Application filed January 27, 1906. Serial No. 298,233.

*To all whom it may concern:*

Be it known that I, ALBERT COLLET, a citizen of the Republic of France, residing in Paris, France, have invented certain new and useful Improvements in Tools for Cutting Seats in Railway-Ties and the Like, of which the following is a specification.

This invention relates to certain improvements in wood working tools or machines, and more particularly in that class of such machines which are especially designed and adapted for routing, so as to be capable of employment for forming gains or seats in wooden railway ties or sleepers for the reception of the rails or rail-chairs, and the object of the invention is to provide a tool of this general character of a simple and comparatively inexpensive construction, having a novel and improved arrangement of cutters whereby such gains or seats may be produced in the railway ties or sleepers without the employment of saw-kerfs such as are usually cut in the ties or sleepers for limiting the lateral extent of the gains or seats and which, by reason of being extended deeper than the gains or seats form grooves wherein moisture is apt to be caught and retained in such a manner as to cause decay of the wood.

The invention consists in certain novel features of the construction, and combinations and arrangements of the several parts of the improved cutting tool, whereby certain important advantages are attained, and the device is rendered simpler, less expensive and otherwise better adapted and more convenient for use, all as will be hereinafter fully set forth.

The novel features of the invention will be carefully defined in the claims.

In the accompanying drawings which serve to illustrate my invention—Figure 1 is a view showing the improved tool in side elevation, and partly in section at the left-hand side of the figure; Fig. 2 is a plan view of the improved tool; Fig. 3 is an enlarged detail view showing one of the lower cutters detached and in side elevation; Fig. 4 is a fragmentary sectional view showing the means for holding the lower cutters in position upon the cutter head, and—Fig. 5 is a sectional view taken horizontally through the improved tool in a plane between the upper and lower cutter heads, and showing the lower cutter head enlarged and in plan.

As shown in these views, the improved tool comprises upper and lower cutter heads A and $A^1$, respectively, which are secured in axial alinement upon a driven shaft C, to which rotatory movement is imparted in any well known way and at any suitable velocity. The upper cutter head A comprises a disk-like body portion having spaced cutter holders $b$, $b$ projecting from it at intervals around its perimeter, and carrying cutters B, B, each of which has a disk-like form and is provided with spaced circular cutting edges $c$, $c$, as clearly shown in Fig. 2. As herein shown there are four of the cutters B carried upon the upper cutter-head, but it is evident that the number of such cutters employed may be varied without departure from the invention.

The cutters B as herein shown are so mounted upon the holders $b$ that their axes are slightly inclined with respect to the axis of the shaft C so as to insure a free penetrating cut at the cutting edges $c$, $c$.

The lower cutter head $A^1$ is in disk-like form and its under surface is provided with a plurality of curved grooves or channels $a$, directed from its central portion toward its periphery as shown in dotted lines in Fig. 5, the outer ends of said grooves or channels $a$ being open at the periphery of the said lower cutter head $A^1$. The said grooves or channels $a$, $a$ are adapted to receive a series of lower cutters $B^1$, $B^1$, each of which comprises a flattened body portion, curved in the direction of its length and having its upper edge portion adapted to be received in one of the said grooves or channels $a$ as clearly shown in Fig. 4 of the drawings. By this arrangement, the flattened knives or cutters $B^1$ of the lower cutter head are caused to extend in substantially radial directions, and are capable of being adjusted endwise along the grooves or channels $a$ in the cutter head so as to permit of compensating for wear of their outer ends which, as herein shown, project beyond the peripheral surfaces of the said lower cutter head.

Each of the lower knife-like cutters $B^1$ is provided with a reinforcing web $e$ centrally extended along its rear surface, and adapted to fit flush upon the underside of the cutter head $A^1$, as clearly shown in Fig. 4, and for holding the said lower cutters in position upon said lower cutter head I provide bolts $d$, $d$ the lower ends of which have clamping lugs $g$, $g$, engaged below the webs of the respective cutters, as shown in Fig. 4, the upper ends of said bolts being extended up through the cutter head $A^1$ and being provided with screw-threads so as to adapt them to receive nuts $f$, $f$. Upon loosening the bolts, the said lower cutters may be adjusted endwise in the grooves or channels $a$, $a$ for taking up wear at their outer ends, and when the nuts are tightened upon the bolts, the cutters are securely clamped and held in adjusted position.

The proportions of the parts of the improved cutting tool are such that the upper cutters B, B, cut through a stroke of greater radius than the lower cutters $B^1$, $B^1$, whereby it will be seen that in the use of the improved tools for cutting seats or gains in railway ties or sleepers, the said upper cutters serve to smooth and remove the surface inequalities and roughness of the ties or sleepers at each side of the seat or gain produced by the lower cutters $B^1$, as clearly shown at $h$, $h$, in Figs. 1 and 2. In this way it will be seen that the said upper cutters serve to produce smooth surfaces along each side of the gain or seat wherein the spikes or other fastenings commonly employed for holding the rail in position upon the ties may be set and driven, so that their heads may be engaged with the flanges at the base or foot of the rail seated in the gain or seat produced by the lower cutters $B^1$.

In the accompanying drawings the shaft C is shown as slightly inclined to the vertical, so as to adapt the seat or gain produced by the lower cutters $B^1$, $B^1$ to receive the inclined base or foot of what is known as the "Vignole" rail, but this is in no sense essential to the present invention. In the drawings the arrow at $x$ indicates the direction of rotation of the improved tool.

In the use of the improved tool, the same may be fed up to the tie T in such a manner as to produce a transverse cut of the full depth desired for the seat or gain across the top of the tie, after which the feeding movement will be reversed and the tool shifted in the direction of the length of the tie so as to produce a second cut parallel with the first. Ordinarily the cutters will have an effective diameter sufficient to produce a gain or seat of the desired width at two cuts, but this is not essential to the invention.

Cutting tools of this general character may be used in connection with various machines arranged to receive them and to impart to them the necessary movements in order that the tools may produce upon the surfaces of the ties or sleepers suitable seats or gains to receive the rails or the chairs which carry such rails.

As shown in the drawings, the inclinations of the axes of the disk-like cutters B, B are such with respect to the direction of rotation indicated by the arrow $x$ that the forward cutting edge $c$ of each cutter is depressed below the plane of the rearmost cutting edge of such cutter, whereby it will be seen that the rearmost cutters are maintained out of contact with the wood and are thereby protected from wear. By this arrangement when the forward cutting edges of the disk-like cutters shall have become dulled or worn, the cutters may be removed from the holders $b$ and reversed so as to present what were formerly their rearmost cutters in position to engage the ties.

Having thus described my invention, what I claim and desire to secure by Letters Patent is:

1. A tool of the character described having an upright rotatable shaft, a lower cutter head on said shaft and provided with peripherally disposed cutters which have their cutting edges disposed parallel with said shaft, and an upper cutter head on said shaft provided with peripherally disposed, circular cutting disks, the diameter of the upper cutter head being greater than that of the lower cutter head.

2. A tool of the character described having an upright rotatable shaft, a lower cutter head on said shaft, an upper cutter head on said shaft, said upper cutter head being of greater diameter than the lower cutter head and being provided with circular cutters which have their axes oblique to the horizon.

3. A tool of the character described comprising a shaft, a cutter head carried thereon, and circular cutters carried by the cutter head, each such cutter having its axis extended in a direction inclined to the length of the said shaft and being provided with two spaced peripheral cutting edges, the rearmost of which cutting edges of each such cutter being maintained, by the inclination of the cutter axis, out of cutting position during the operation of the tool.

4. A tool of the character described comprising a shaft, upper and lower cutter heads carried thereon, and cutters on the respective cutter heads, the cutters of the upper cutter head having a stroke of greater radius than those of the lower cutter head, and the cutters of the lower cutter head being provided with cutting edges extended parallel with the shaft.

5. A tool of the character described comprising a shaft, and upper and lower cutter heads carried thereon and provided with cutters, the cutters of the upper cutter head having a stroke of greater radius than those of the lower cutter head, and the cutters of the lower cutter head being capable of adjustment in directions radial with respect to the said shaft.

6. A tool of the character described comprising a shaft, upper and lower cutter heads carried thereon and provided with cutters, the cutters of the upper cutter head having a stroke of greater radius than those of the lower cutter head, and the cutters of the lower cutter head being capable of adjustment in directions radial with respect to the said shaft, and devices carried by the lower cutter head and engageable with the cutters thereof for holding said cutters in adjusted position.

7. A tool of the character described comprising a shaft, upper and lower cutter heads carried thereon and provided with cutters the cutters of the upper cutter head having a stroke of greater radius than those of the lower cutter head, and the cutters of the lower cutter head being capable of adjustment in directions radial with respect to the said shaft and having reinforcing webs produced upon them, and clamping devices carried by the lower cutter head and engageable with the webs of the cutters thereof for holding such cutters in adjusted position.

In witness whereof I have hereunto signed my name this 10th day of January 1906, in the presence of two subscribing witnesses.

ALBERT COLLET.

Witnesses:
JULES ARMENGAUD, Jeune,
HANSON C. COXE.